United States Patent [19]

Ady et al.

[11] Patent Number: 5,764,492
[45] Date of Patent: Jun. 9, 1998

[54] RADIO DEVICE WITH RADIO SHIELDING AND METHOD OF MANUFACTURE

[75] Inventors: Roger W. Ady, Chicago; William R. Groves, Naperville, both of Ill.; Larry J. Zibrik, Vancouver, Canada; Robert Cosbey, Kirkland; Van Oler, Redmond, both of Wash.

[73] Assignee: Motorola, Inc., Schaumburg, Ill.

[21] Appl. No.: 679,412

[22] Filed: Jul. 8, 1996

[51] Int. Cl.$^6$ ............................................. H05K 9/00
[52] U.S. Cl. .................. 361/818; 361/753; 361/800; 361/816; 361/801; 361/802; 361/740; 174/35 R; 174/35 GC; 174/35 TS
[58] Field of Search ..................... 455/89–91, 347, 455/348, 351, 128, 352; 340/825.44; D14/138; 361/728–729, 740, 747, 759, 752, 753, 814, 816, 818, 800–802, 220, 223; 174/35 R, 35 GC, 35 TS

[56] References Cited

U.S. PATENT DOCUMENTS

| | | | |
|---|---|---|---|
| 4,680,676 | 7/1987 | Petratos et al. | 361/818 |
| 5,485,517 | 1/1996 | Gray | 379/433 |
| 5,536,905 | 7/1996 | Redman et al. | 174/35 GC |

FOREIGN PATENT DOCUMENTS 0 371 708  6/1990  European Pat. Off. .

OTHER PUBLICATIONS

Pending patent U.S. application No. with the U.S. Ser. No. 08/317,085 of Ogden et al. filed Sep. 30, 1994 with Motorola Docket No. PD05228AV.

*Primary Examiner*—Leo P. Picard
*Assistant Examiner*—Phuong T. Vu
*Attorney, Agent, or Firm*—Pedro P. Hernandez

[57] ABSTRACT

A radio device such as a radio modem having a radio shielding receptacle (10) with a base (16) and first and second sides (40, 42) and having side walls (14). A first circuit board (e.g. radio frequency circuit board 20) is mounted in the receptacle between the side walls, extending across the first side of the base. A second circuit board (e.g. logic circuit board 22) is mounted across the second side of the base such that the base of the receptacle separates the first and second circuit boards. A radio shielding housing (top assembly cover 26 and bottom cover 38) surrounds the receptacle and the first and second circuit boards. In an aspect of the invention the device is dimensioned to conform to a Personal Computer Memory Card International Association standard and has an antenna connection (76). An elongate recess (74) extends between the two sides of the housing and the antenna connection is mounted within the recess.

14 Claims, 3 Drawing Sheets

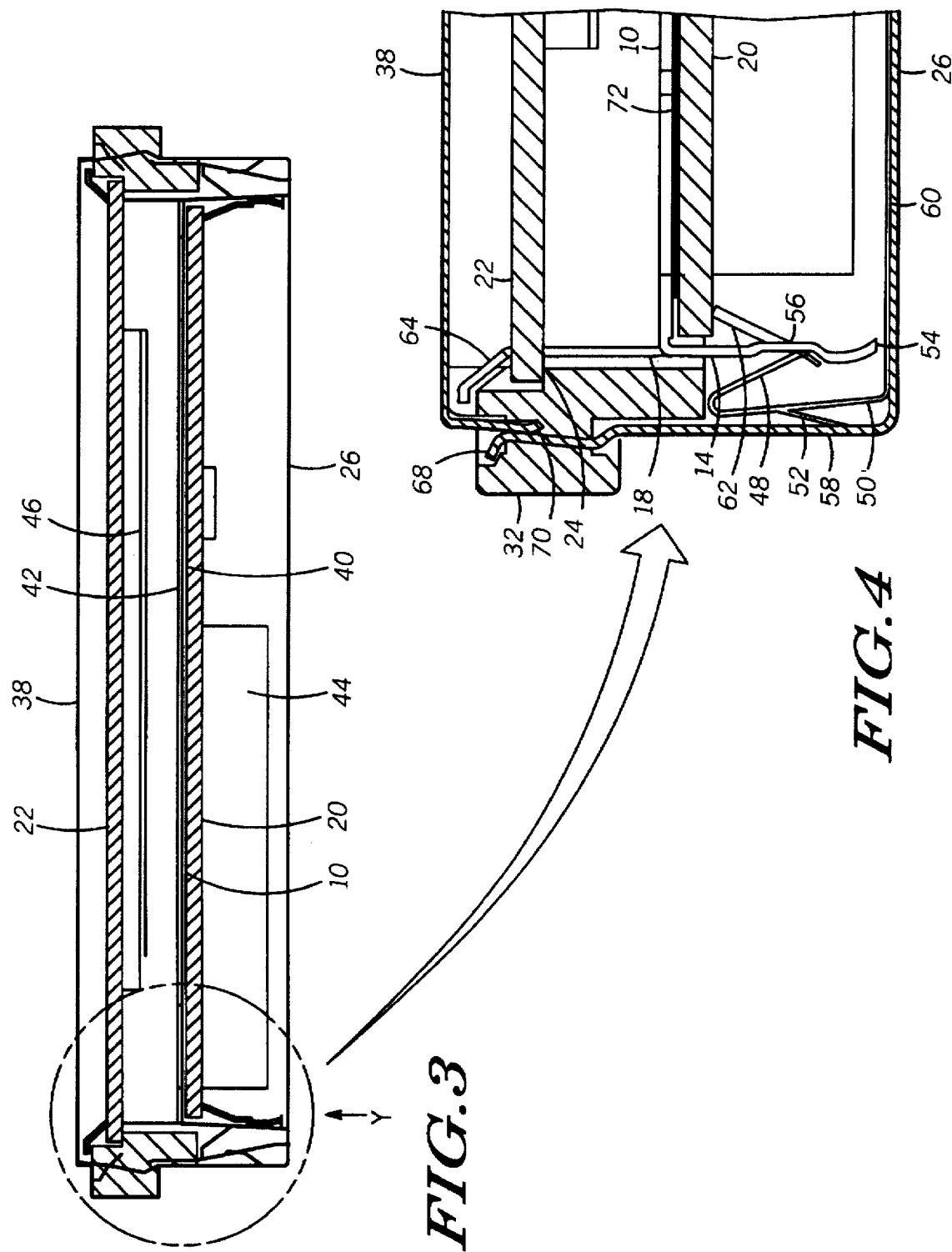

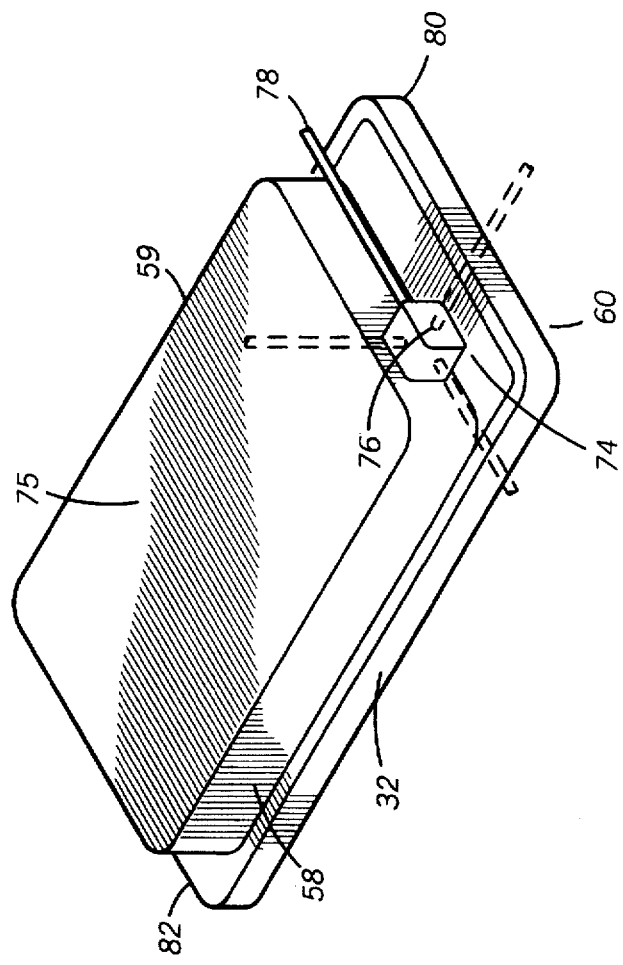
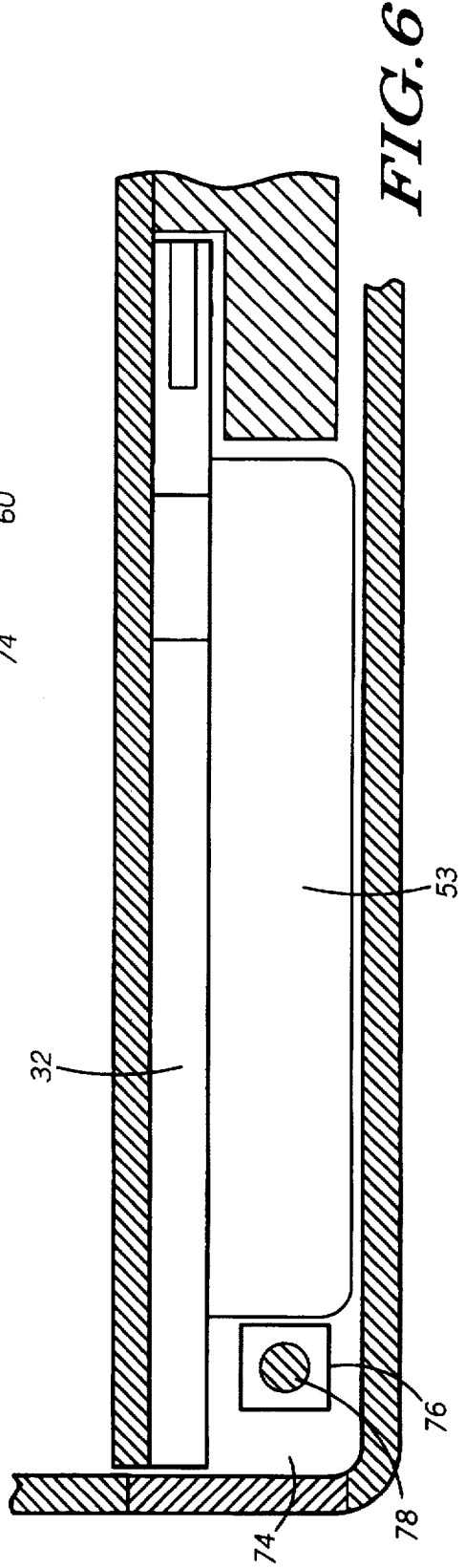

RADIO DEVICE WITH RADIO SHIELDING AND METHOD OF MANUFACTURE

FIELD OF THE INVENTION

This invention relates to a radio modem or other radio device having radio shielding, and it relates to a method of manufacture thereof.

BACKGROUND OF THE INVENTION

Personal Computer Memory Card International Association ("PCMCIA") devices have rapidly become the de facto standard for both factory modules and customer installed modules in the broader electronics industry. These include such devices as memory, disk drives and modems. In the design of electronic packaging it is often desirable to locate these PCMCIA style devices with the end opposite the connector end flush to the host's housing and/or internal components. The reasons include: (1) allowing manufacturers to build a "one size fits all" product based on the PCMCIA standard which can then be configured at the factory and/or by the consumer; and (2) minimizing the valuable space required to incorporate such a PCMCIA device.

Wireless voice and data devices are often partitioned at the printed circuit board ("PCB") level into a digital logic section and an analog radio frequency section. Electromagnetic interference ("EMI") interactions between the two sections must typically be minimized for optimal performance and thus an overall subassembly shielding mechanism is typically required above and beyond the smaller component shielding. Most such shielding schemes involve large reflowed shields which are difficult to manufacture to the required flatness and offer very limited repair options in the factory as well as the field. Expensive and more complicated shield/fence designs, spring contact designs, and conductive coating designs are often reverted to as a last resort.

Another problem in the design of these devices is the tendency to build all the electronics onto a single PCB to avoid the difficulties inherent in testing and mounting separate PCB elements. However, this results in several limitations: (1) it dictates a thinner but larger product size; (2) it requires scrapping a more expensive assembly whenever a failure occurs; (3) it does not allow the more finicky radio frequency (RF) section to be built in higher quantities to account for greater manufacturing yield losses; (4) it does not allow separate assembly lines or facilities to be used to optimize the setup and testing for each type of PCB; and (5) it requires service depots and field repair personnel to stock and replace the entire PCB assembly instead of just the defective PCB subassembly.

Despite the deficiencies noted above, large reflowed shields and complicated shielding mechanisms using conductive coatings, spring clips, etc. represent the prior art in radio design. Moreover, single PCB designs (i.e., 2-dimensional PCB's) dominate the electronics of wireless voice and data devices.

Some PCMCIA devices require additional interfaces beyond the PCMCIA header for such things as auxiliary power or—in the case of most any wireless device—an antenna connection. The cabling and connector clearance required for this forces the manufacturer to either allocate additional space internally or allow the interconnections to protrude from the product (as in the case of a PCMCIA device mounted through an external opening or door). Antenna connections are problematic because a coaxial cable must be mounted to the device and such cables are relatively bulky and cannot be bent sharply.

There is a need for an improved housing to achieve a low cost RF compatible product design meeting emissions, de sense and other design criteria.

SUMMARY OF THE INVENTION

The invention has various aspects and embodiments, including but not limited to the following.

According to one aspect of the invention, a radio device (for example a radio modem) is provided comprising a radio shielding receptacle having a base with first and second sides and having side walls. A first circuit board, for example a radio frequerncy (RF) circuit board, is mounted in the receptacle between the side walls, extending across the first side of the base. A second circuit board, for example a logic board, is mounted across the second side of the base such that the base of the receptacle separates the first and second circuit boards. A radio shielding housing surrounds the receptacle and the first and second circuit boards.

In a preferred embodiment a radio shielding annular gasket is mounted between the receptacle and the surrounding housing.

According to another aspect of the invention, a method of assembly of a radio device is provided. Into a radio shielding receptacle having a base with first and second sides and having side walls is mounted a first circuit board. The first circuit board is mounted between the side walls, extending across the first side of the base. A second circuit board is mounted across the second side of the base such that the base of the receptacle separates the first and second circuit boards. The receptacle and the first and second circuit boards are housed in a radio shielding housing surrounding the first and second circuit boards.

According to a further aspect of the invention, a radio device is provided comprising a cuboid housing dimensioned to conform to a Personal Computer Memory Card International Association standard comprising a bottom, a top, two sides and two ends and having an antenna connection, wherein one end has an elongate recess extending between the two sides and wherein the antenna connection is mounted within the elongate recess.

A preferred embodiment of the invention is described, by way of example, with reference to the drawings.

BRIEF DESCRIPTION OF THE DRAWINGS

Other advantages and features of the invention are described with reference to preferred embodiments which are intended to illustrate and not to limit the invention and in which:

FIG. 3 is a view on line X—X of FIG. 1;

FIG. 4 is an enlarged view of the portion of FIG. 3 within the circle Y;

FIG. 5 is a perspective view of a radio modem from the top and the front; and

FIG. 6 is a cross-sectional view of a portion of a host computer with the radio modem of FIG. 5 mounted in place with the top assembly cover lowermost.

DETAILED DESCRIPTION OF THE DRAWING

Figure 1:
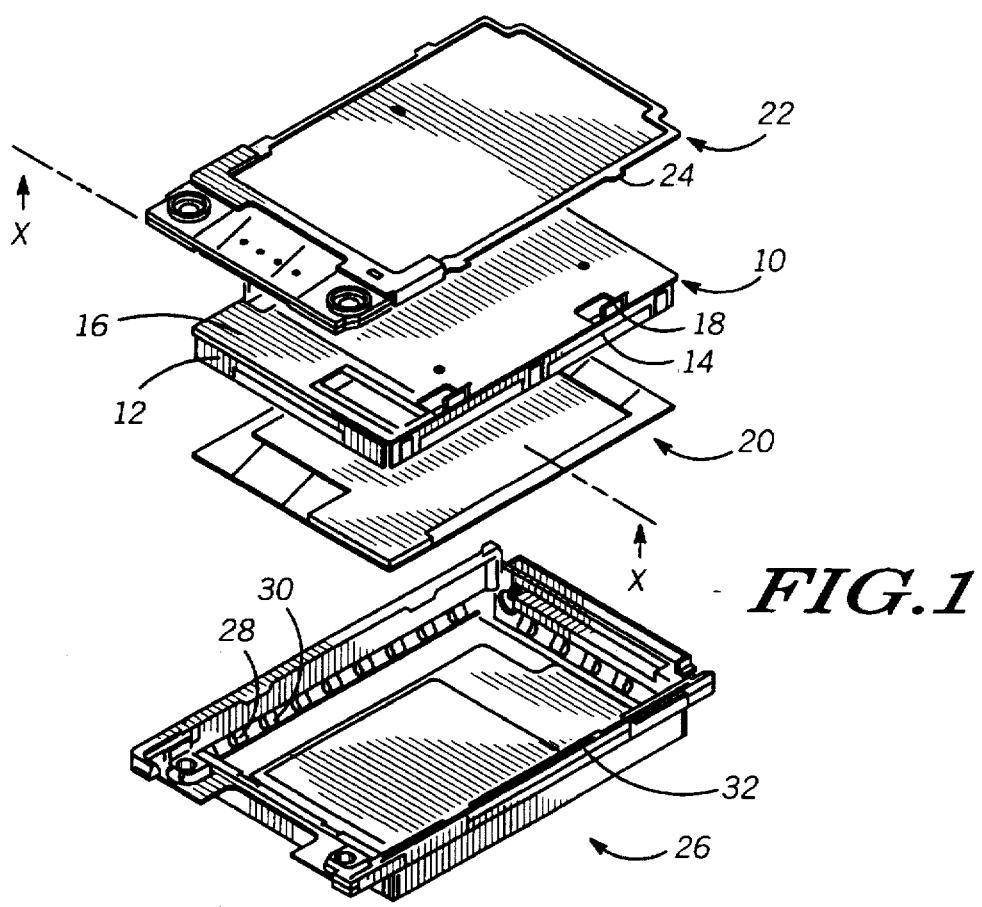
FIG. 1 is an exploded perspective view from the underside of a radio modem according to a preferred embodiment of the invention.

Referring to FIG. 1, a radio device is shown in the form of a radio modem having a radio shielding receptacle 10, which is made of metal or other radio shielding material and comprises an end 12, a side wall 14, a base 16, and a lug 18. Directly positioned under the radio shielding receptacle 10 is a RF PCB 20. Directly positioned above the radio shielding receptacle 10 is a logic PCB 22 having mounting projections 24. Also shown in FIG. 1 is a top assembly cover 26. The top assembly cover 26 includes a radio shielding annular gasket 28 of metal or other radio shielding material, a number of spring members distributed in an annular distribution and formed as part of the annular gasket 28, for example spring member 30, and plastic side rails 32 and 33.

Figure 2:
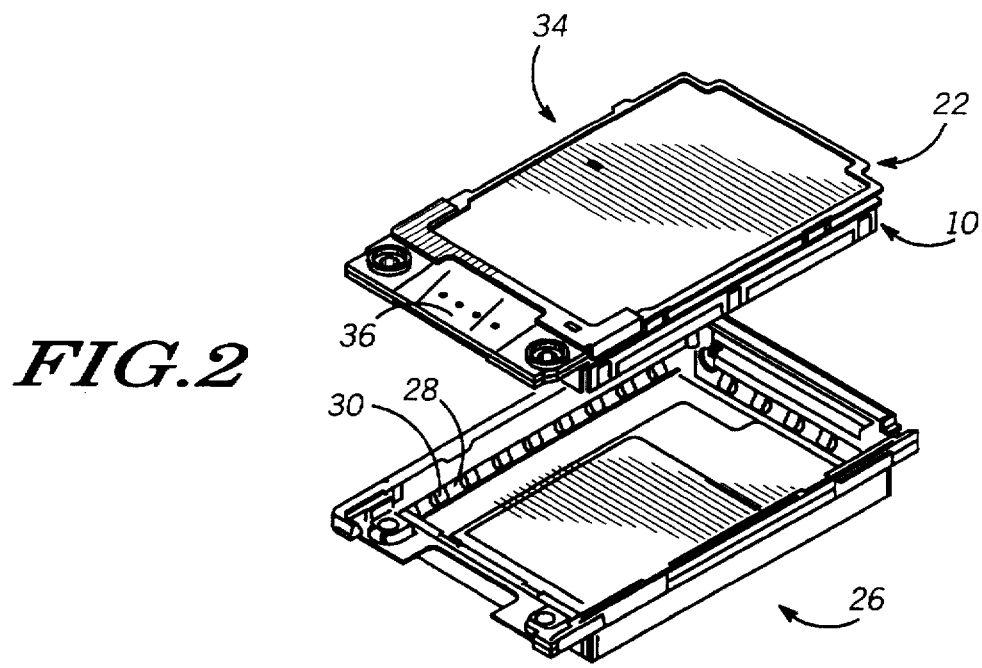
FIG. 2 is a perspective view of the elements of FIG. 1 partially assembled.

FIG. 2 is a perspective view of the elements of FIG. 1 partially assembled. As shown, the logic PCB 22 is mounted on the top of the radio shielding receptacle 10. Further, which cannot be seen from the view shown in FIG. 2, the RF PCB 20 is mounted on the bottom of the radio shielding receptacle 10.

Thus, the RF PCB 20, the radio shielding receptacle 10, and the logic PCB 22 makes up the subassembly 34. The subassembly 34 is then connected into the top assembly cover 26. Also shown on the subassembly 34 are connectors 36 for electrical connections to a host computer. The radio shielding annular gasket 28 and the spring members of the annular gasket 30 are also shown inside the top assembly cover 26.

FIG. 3 is a view on line x—x of FIG. 1. In this illustration, a bottom cover 38 is shown as well as the top assembly cover 26. In FIG. 3, a first side 40 of the base 16 of the radio shielding receptacle 10 and a second side 42 of the base 16 of the radio shielding receptacle 10 are shown. The RF PCB 20 extends across the first side 40 of the base 16 and the logic PCB 22 extends across the second side 42 of the base 16. The RF PCB 20 supports a radio modem component 44 and the logic PCB 22 supports a logic component 46.

FIG. 4 is an enlarged view of the area within circle Y from FIG. 3. This figure shows in detail that the annular gasket comprises a first 48, a second 50 and a third 52 spring member. The first spring member 48 contacts the side wall 14 of the receptacle 10. There is an indentation 56 in the side wall 14 where the first part of the spring member 48 connects to the side wall 14.

The second spring member 50 exerts and inward spring force on the first spring member 48, pressing the latter against the side wall 14 of the receptacle 10. The third spring member 52 extends outwardly from the second spring member 50 and contacts the top assembly cover 26, exerting an inward force on the second spring member 50.

Protruding from the wall 14, extending into the receptacle, is a latch element 62. The latch element holds the RF PCB 20 in position in the receptacle 10 so that the RF PCB extends across the first side 40 of the base 16 of the receptacle 10.

The radio modem has a bottom cover 38 of metal or other radio shielding material, having an inwardly splayed rim 70. the top assembly cover 26 has an outwardly splayed rim 68. The rim of the bottom cover is positioned within the rim 68 of the top assembly cover, providing a good RF seal. The respectively splayed rims aid assembly.

The top assembly cover 26 and the bottom cover 38 together form a radio shielding housing surrounding the receptacle and the first and second circuit boards.

An end 64 of the lug 18 is splayed outwards. This aids insertion of the logic PCB into its position with each mounting projection 24 latching in place in a hole in the respective lug 18.

A plate 72 is provided, extending across the first side 40 of the base 16 of the receptacle 10. The plate 72 closes off certain holes in the base of the receptacle which are formed as a result of the lugs 18 being cut and bent out of the metal of the receptacle 10.

In operation, the annular gasket 28 provides RF isolation between the RF PCB 20 within the receptacle 10 and the logic PCB 22. The annular gasket 28 seals the gap between the receptacle 10 and the top cover assembly, so that the RF PCB is effectively enclosed and RF leakage is prevented from the RF PCB to the logic PCB and out of the housing formed by the top receptacle 10 and the bottom cover 38.

The various elements of the radio modem facilitate its construction. In construction, the RF PCB is inserted into the receptacle 14 and pressed into the receptacle 10 until the PCB edge passes the latch elements (e.g. latch element 62) the PCB is latched in place. The RF PCB 20 is removable by forcing the latch elements outwards. The subassembly 34 of FIG. 2 is completed by pressing the logic PCB 22 into place between the lugs 18 of the receptacle 10, made simple by the splayed ends 64 which are displaced outwards when the logic PCB is inserted in place. The logic PCB can be removed by forcing apart the lugs 18.

The top assembly cover has its plastic side rails premounted and the annular gasket 28 is placed in the top assembly cover 26. The third spring member 52 assist in holding it in place, but further or alternative means can be used, e.g. adhesive. Next the subassembly 34 is pressed into the top cover until each first spring member 48 latches into place in the indentation 56 in the side wall 14 of the receptacle 10.

Finally the bottom cover 38 is pressed into position within the rim 68 of the top assembly cover and is held in place by friction between the rim 68 of the top cover assembly 26 and the rim 70 of the bottom cover 38.

Thus, a split PCB design has been described as implemented in a miniature radio modem. A multi-functional radio shielding receptacle retains the RF PCB, retains the logic PCB, provides EMI isolation between the two subassemblies and provides EMI contact to the external casing which completes the EMI isolation of the top and bottom sections upon assembly.

The embodiment of the invention disclosed and described with reference through FIGS. 1 to 4 provides a receptacle design that is used to facilitate a compact "stacked-PCB" form factor which is otherwise difficult to achieve. The design accommodates the manufacturing and support operations by allowing separate PCB subassemblies to be used (with all the attendant advantages itemized above) while simplifying the assembly and test of the final product by (1) allowing the RF PCB 20 and the logic PCB 22 to be snapped into the radio shielding receptacle 10 yet retained rigidly when the radio shielding receptacle 10 is slid into the surrounding shell; (2) allowing the PCBs to be easily removed from the radio shielding receptacle 10 for repair when the surrounding shell is removed; and (3) providing an electronically coherent and easy to handle subassembly 34 comprised of both the RF 20 and the logic 22 PCBs and the radio shielding receptacle 10 which can be transported, stocked, and tested for full functionality before being brought to final assembly. Of significance, preliminary testing on the design verified that the design objectives for EMI isolation and mechanical robustness can be amply met with this concept.

FIG. 5 is a perspective view of the radio modem from the top and the front illustrating a second aspect of the invention. The radio modem has a housing with a generally cuboid shape dimensioned to conform to a Personal Computer Memory Card International Association standard, comprising a bottom 60, a top 75, two sides 58, 59, a front end 80 and a back end 82. An elongated recess 74 extends between the sides 58 and 59 and an antenna connection 76 and an antenna cable 78 are provided in the recess 74. The antenna connection is preferably a swivel mount (i.e. a universal joint), rotatable in different dimensions to many different positions. Alternatively, the antenna cable 78 can be mounted in any of a number of different fixed orientations as shown in phantom outline.

FIG. 6 is a cross-sectional view of a portion of a host computer with the radio modem mounted in place with the top assembly cover 26 lowermost. Also shown is the elongated recess 74.

The second aspect of the invention, as illustrated in FIGS. 5 and 6, provides a means to incorporate the addition of an external interface while maintaining the specified PCMCIA specifications. Eliminating the need to violate the PCMCIA specifications assures manufacturers that such a device will fit into their host products without special design considerations. Thus, this invention provides a means of incorporating an external interface to the end opposite the connector end while maintaining the PCMCIA specification.

We claim:

1. A radio device comprising:
   a radio shielding receptacle having a base with first and second sides and having side walls;
   a first circuit board mounted in the receptacle between the side walls, extending across the first side of the base;
   a second circuit board mounted across the second side of the base such that the base of the receptacle separates the first and second circuit boards;
   a radio shielding housing surrounding the receptacle and the first and second circuit boards; and
   a radio shielding annular gasket between the receptacle and the surrounding housing, wherein the annular gasket is a metal gasket comprising spring members distributed in an annular distribution around the receptacle.

2. A radio device according to claim 1, wherein each spring member of the annular gasket is adjacent a side wall of the receptacle and comprises a first part in contact with the side wall of the receptacle.

3. A radio device according to claim 2, wherein each side wall of the receptacle has an inwardly formed indentation where each spring member first part contacts the side wall.

4. A radio device according to claim 3, wherein at least one spring member of the annular gasket further comprises a second part connected to the first part, exerting spring force on the first part to cause the first part to contact the side wall of the receptacle.

5. A radio device according to claim 4 wherein the at least one spring member comprises a third part extending from the second part, where the third part contacts the radio shielding housing, exerting a spring force pushing the second part and the first part inwards from the radio shielding housing.

6. A radio device according to claim 1 wherein the receptacle further comprises spring latch elements, projecting inwardly from the side walls of the receptacle towards the first side of the base for holding the first circuit board in the receptacle.

7. A radio device according to claim 1, wherein the receptacle comprises at least two lugs extending from the base away from the second side, the second circuit board being mounted between the at least two lugs.

8. A radio device according to claim 7, wherein each lug has an outwardly splayed end for displacement by the second circuit board when the second circuit board is mounted between the at least two lugs.

9. A radio device according to claim 1 wherein the housing comprises a top cover assembly and a bottom cover, wherein the first and second circuit boards and the receptacle are mounted within the top cover assembly.

10. A radio device according to claim 9, wherein the top cover assembly has an outwardly splayed rim and the bottom cover is mounted within the rim of the top cover assembly.

11. A radio device according to claim 1 comprising radio elements mounted on the first circuit board and logic elements mounted on the second circuit board.

12. A radio device comprising:
    a radio shielding receptacle having a base with first and second sides and having side walls;
    a first circuit board mounted in the receptacle between the side walls, extending across the first side of the base;
    a second circuit board mounted across the second side of the base such that the base of the receptacle separates the first and second circuit boards; and
    a radio shielding housing surrounding the receptacle and the first and second circuit boards,
    wherein the receptacle comprises at least two lugs extending from the base away from the second side, the second circuit board being mounted between the at least two lugs and the second circuit board has a plurality of mounting projections and each lug has a hole for receiving a corresponding one of the plurality of mounting projections.

13. A radio device comprising:
    a radio shielding receptacle having a base with first and second sides and having side walls;
    a first circuit board mounted in the receptacle between the side walls, extending across the first side of the base;
    a second circuit board mounted across the second side of the base such that the base of the receptacle separates the first and second circuit boards;
    a radio shielding housing, surrounding the receptacle and the first and second circuit boards, the housing comprising a bottom, a top, two sides and two ends, wherein one end has an elongate recess extending between the two sides;
    an antenna connection mounted within the elongate recess; and
    a radio shielding annular gasket between the receptacle and the housing, wherein the annular gasket comprises spring members distributed in an annular distribution around the receptacle.

14. A method of assembly of a radio device comprising:
    providing a radio shielding receptacle having a base with first and second sides and having side walls;
    mounting a first circuit board in the receptacle between the side walls, extending across the first side of the base;
    mounting a second circuit board mounted across the second side of the base such that the base of the receptacle separates the first and second circuit boards;
    housing the receptacle and the first and second circuit boards in a radio shielding housing comprising a bottom, a top, two sides and two ends, wherein one end has an elongate recess extending between the two sides;

connecting an antenna connection to the radio device within the elongate recess; and providing a radio shielding annular gasket between the receptacle and the housing, wherein the annular gasket comprises spring members distributed in an annular distribution around the housing.

* * * * *